July 24, 1956  M. MACCAFERRI  2,755,508
MOLD APPARATUS FOR TILES AND OTHER PLATE-LIKE STRUCTURES
Filed May 26, 1952  7 Sheets-Sheet 3

Fig. 5.

INVENTOR:
Mario Maccaferri
BY Peck + Peck
ATTORNEYS

July 24, 1956 M. MACCAFERRI 2,755,508
MOLD APPARATUS FOR TILES AND OTHER PLATE-LIKE STRUCTURES
Filed May 26, 1952 7 Sheets-Sheet 4

United States Patent Office 2,755,508
Patented July 24, 1956

2,755,508

MOLD APPARATUS FOR TILES AND OTHER PLATE-LIKE STRUCTURES

Mario Maccaferri, Rye, N. Y.

Application May 26, 1952, Serial No. 289,977

9 Claims. (Cl. 18—30)

The present invention relates to mold apparatus for tiles and other plate-like structures, and more specifically to such apparatus for the injection molding of thermoplastic materials into sheet or plate-like forms; and the nature and objects of the invention will be readily recognized and understood by those skilled in the arts involved from the following explanation and detailed description of the accompanying drawings illustrating what I at the present consider to be the preferred embodiments or mechanical expressions of my invention from among various other forms, embodiments, designs, constructions, arrangements and combinations of which the invention is capable of expression within the broad spirit and scope thereof as defined and determined by the claims hereto appended.

The invention holds as one of its primary objects the provision of a design and construction of an injection mold by which a thermoplastic material may be efficiently injection molded into relatively large area, thin section sheet or plate-like form of substantially uniform density, by a single injection molding cycle with a minimum resistance to flow and an even distribution of the injected material throughout the area of the relatively large area mold cavity within the period of time allotted to mold cavity charging by the molding cycle.

Another object is to provide such a mold apparatus adapted for use on and with standard types of injection molding machines to thereby eliminate the necessity of designing and building special machines for injection molding with mold apparatus of my invention.

A further object is to provide a design and construction of injection mold having a relatively large area, shallow depth mold cavity for molding therein a thin-section plate-like component, in which the molding material is directly injected into such shallow mold cavity simultaneously at a plurality of spaced injection points.

Another object is to provide a design of such a mold by which the shallow, relatively large area mold cavity is so formed and shaped that the surfaces defining the mold cavity will offer minimum resistance to flow and distribution throughout the mold cavity whereby the speed of the molding cycle may be increased and the injection pressures decreased, or, utilizing the same injection pressures and speed of cycle, the area of the mold cavity and hence the area of the component molded therein, may be substantially increased.

Another object is to so design the mold cavity of such a mold that a substantially uniform distribution of the injected charge of material throughout the area of the cavity is obtained at substantially proportionately uniform pressures over the area of distribution, so that a substantially uniform density of the material is obtained throughout the area of the cavity with resulting decrease in the molding conditions tending to set-up internal stresses in the component molded in the cavity.

A further object is to provide an injection mold for the efficient injection molding therein as a completely finished unit by a single injection molding cycle, of a relatively large area, thin-section, plate-like component.

A further object is to provide such an injection mold for molding such a large area, thin-section, plate-like component with a multiplicity of apertures therethrough distributed over the area thereof in a relatively closely spaced relationship.

A further object is to provide a design and construction for such an injection mold for molding therein a thin section, plate-like component having a multiplicity of apertures therethrough, by which a plurality of tube-like projections may be molded integrally therewith and projecting from one side of the component in axial alignment with the apertures, or some of them.

Another object is to provide a mechanically and structurally simple and efficient design and arrangement of such a mold by which a continuous, angularly disposed edge flange may be molded on and around a thin section, plate-like component produced by injection molding in the mold cavity of the mold.

The invention, in carrying out the objectives for the apertured component molding forms thereof, is characterized by a mold formed of relatively movable, separable sections with a multiplicity of aperture forming core pins mounted on one of the sections, and a further object is to so design and construct the mold and mount the core pins that such pins will be automatically retracted to positions completely removed from the molded component and from the mold cavity when the mold sections are in completely opened position, to thereby release and free the molded component for discharge automatically from the mold under the action of gravity.

Another main object of the invention of general application to injection molds for injection molding with thermoplastic materials, as well as to the molds of the various forms and features as generally set forth hereinabove, is to provide a design and arrangement by which a mold may be efficiently operated in a continuous series of injection molding cycles without the necessity of holding the mold in partially open, or fully open positions, prior to the full opening or prior to the closing thereof for the next molding cycle, in order that solidified molding material such as sprues and runners, may be removed manually from the mold.

A further object is to provide an efficient construction of runners and sprue or discharge openings together with a system of heating units therefor in the injection side of the mold to eliminate solidification of molding material therein during the opening of the mold for discharge of a molded component therefrom; and a further object in this connection is to provide for automatic temperature control of the system of heating units.

It is a still further and specific object to provide forms of molds incorporating the foregoing objects and features designed for the injection molding therein of specific forms of apertured acoustic tiles, with or without tube members projected from one side thereof, and having continuous, angularly disposed edge flanges therearound integral therewith.

With the foregoing and various other objects, features and results in view which will be readily apparent from the following description, my invention consists in certain novel features in design and in construction, and in combinations and arrangements of elements and components, all as will be more fully referred to and specified hereinafter.

Referring to the accompanying drawings in which similar reference characters refer to corresponding parts and elements throughout the several figures thereof.

The examples of mold apparatus which I have selected and illustrated and described herein for purposes of explaining the principles and features of my invention, are in each instance of a form and design for the injection molding of specific forms and constructions of acoustic tiles. It is to be understood, however, that the mold forms disclosed herein were selected primarily as examples and not to limit the invention to expression only to such forms for the specific tile constructions to be produced therewith. Such acoustic tiles present molded components of a relatively complicated design and construction with the multiplicity of apertures, nailing bosses and edge flange, and in certain forms thereof with a multiplicity of damping tubes molded integrally therewith, and the illustrated mold apparatus designed to produce such tiles serve to more clearly illustrate and exemplify the various features of my present invention. The invention is intended to be expressed in forms for the injection molding of various designs and constructions of molded components characterized by a relatively thin large area portion, whether such portion be solely in the form of a simple flat sheet or plate without apertures and without portions or elements projecting from the plane thereof, or in more complicated forms such as typified by the acoustic tiles of the examples hereof.

One form of mold apparatus of the invention is illustrated in Figs. 1 through 13 of the drawings. This form of the mold is of the type for substantially continuous operation in accordance with one of the basic features of my invention, and is characterized by a mold apparatus which comprises a fixed, injection section F and a movable section M together with a molding material heating and distributing unit H mounted in the injection section F. The mold formed of sections F and M is designed to provide a unit for operative mounting in standard types of injection molding machines familiar to the art. As will be readily understood, the mold apparatus of the invention, say of the form of Figs. 1 through 13, is mounted in the injection molding machine with the fixed, injection section F of the mold attached to the fixed platen 2 of the injection molding machine and with the movable mold section M attached to the movable platen 3 of the machine. Thus, the movable mold section M in an injection molding cycle is moved by the movable platen 3 of the machine, from open, discharging position spaced from fixed section F to mold closing position clamped against the fixed section and then back to open, discharging position to complete the cycle. The various standard types of injection molding machines are sufficiently familiar to the art so that it is not considered necessary herein to make disclosures thereof beyond the more or less schematic indication of the platens 2 and 3, and of certain other parts thereof also schematically illustrated and referred to hereinafter.

In the present example, referring to Figs. 1 through 13 the mold apparatus has the mold sections F and M each made up of a series of generally rectangular, in this specific instance square, metal blocks and plates. The fixed section F of the mold includes the relatively thick back plate or block 10 which is adapted to be positioned with its outer face generally parallel with and facing the movable platen when the mold section F is bolted or otherwise secured in position attached to the fixed platen 2 of the molding machine. The plate 10 is provided at a central location thereon with the sprue opening or molding material intake formed by the sprue bushing 11 having the axial bore 12 therethrough. A locating ring 14 is mounted on plate 10 surrounding the outer end of the sprue bushing for the purpose of centering the mold section on the machine platen 2 with the injection nozzle 4 of the molding machine in engagement in the outer end of bushing 11 in registry with the sprue passage 12, in a manner familiar in the art and as diagrammatically indicated in Fig. 9 of the drawings.

The fixed section F is completed by the intermediate plate 15, in which is mounted the distributing and heating unit H, the cooling plate 15a at the outer or movable section side of and attached to plate 15, and the mold cavity closing or core plate 60, which in this example is shown as attached to a base plate 65 with these plates 60 and 65 constituting a unit plate which is secured on and over the outer side of the cooling plate 15a in rigid position attached thereto. The inner or exposed side of the core plate 60 is formed and provided with an elevated, raised or outwardly extended mold cavity closing core portion 61, while the outer surrounding face or surface 60a of the plate 60 is precisely machined or finished to present a planar, seating surface against which adjacent, complementary surfaces of the movable section M are engaged when section M is clamped in mold closing position against the fixed section F, as will be referred to in detail hereinafter. The plate 15 which is located between the back plate 10 and the cooling plate 15a, is formed with a cross-like opening therethrough centrally located thereon and providing a central space 17 from which radiate the spaces 18 equally spaced apart therearound to form the arms of such cross-like opening through the plate. The inner sides of the central space 17 and of the spaces 18 are closed by the back plate 10, while the opposite sides thereof are closed by the cooling plate 15a.

The molding material heating and distributing unit H is, in the particular example hereof, comprised of a casting or body of cross-shape in plan to provide a central body or hub 20 with arms 21 extended radially therefrom and spaced apart equal distances therearound. The width and the length dimensions of the arms 21 and the width or diameter dimension of the central body or hub 20, are slightly less than the corresponding dimensions of the spaces 17 and 18, respectively, provided by the cross-like opening through the plate 15, while the thickness of hub 20 and arms 21 is substantially uniform throughout but slightly less than the thickness of the plate 15. The unit H so formed and dimensioned is mounted and positioned in the cross-like space in plate 15, being centrally spaced therein. Hence, due to the smaller dimensions of unit H, there is provided an air space completely therearound. In this instance, I position the unit H in the desired central position in the plate opening by providing pillars or spacing plates 19 between the inner side of the unit and the back plate 10 and between the opposite side of the unit and the intermediate plate 15 of section F. The thickness of plates 19 is such that they are tightly engaged between the opposite sides of the unit and plates 10 and 15, respectively, while the plan dimensions of each of the plates 19 is substantially less than the plan dimensions of the unit H, as will be clear by reference to Fig. 1 of the drawings. In this specific example the pillars or spacing plates 19 may be of cross-shape in plan and formed of a heat insulating material having high compressive strength and capable of being precision ground to the uniform thickness required. In this cross form the width of each of the arms of a spacer 19 may be relatively narrow compared to the width of an arm 21 of the heating unit in order to provide substantial air space around the unit H which can be packed with any suitable loose bulk or preformed heat insulating material 19a. Thus, in assembled relation in the fixed section F these insulating material plates 19 function to insulate and reduce heat loss from the unit H, as well as to position the unit in the assembly and to transmit molding pressures from movable section M, through unit H to the plate 15. Instead of the one-piece cross-like form of the example, such spacing and insulating plates may take the form of separate strips inserted at and along opposite sides of the arms and unconnected at their inner ends.

The cooling plate 15a is in this instance formed as a solid, one-piece plate and is formed with a system of cooling water ducts or passages 15b extending thereinto and therethrough and having the cooling water intakes 15c and discharges 15d located in and opening through the edge walls of the plate for tapped connection therein of cooling water supply and discharge lines in the usual manner generally familiar in the art. In this particular example the system of cooling water ducts 15d in the cooling plate 15a is comprised by sets of separate ducts each with its own inlet 15c and outlet 15d.

The distributing and heating unit H in this example is formed as an integral casting but if desired or found expedient it may be formed in sections suitably secured together, or it may be formed in any other desired or suitable manner. However, formed unit H is provided with an axial passage or manifold 22 which opens through the inner side of the central body 20 with runner ducts 23 being formed to extend from passage 22 outwardly through and longitudinally of the arms 21, respectively. The body 20 is formed with an annular recess 22a in the inside thereof concentric with and surrounding the intake end of the passage or manifold duct 22. The sprue bushing 11 is formed with an extended end 11a having an external diameter to fit into the recess 22a and from a sealing fit with the wall of that recess formed by body 20. In assembled relation, as will be clear by reference to Fig. 2, the sprue duct 12 is axially aligned with and discharges into manifold duct 22 which latter forms an inward continuation of the duct 12. Each runner duct 23 extends outwardly through its arm 21 from the manifold duct 22 to a point spaced inwardly a distance from the outer end of the arm. An injection nozzle 24 is secured in fixed position in each arm 21 disposed with its axis normal to the plate 15 and perpendicular to the axis of the runner duct 23 in the arm. The injection nozzle 24 on each arm opens into the runner duct 23 of that arm at a point spaced a slight distance inwardly from the outer end of the duct so that such outer end forms a cold slug receiving cavity. The nozzles 24 are mounted in the cooling plate sides of the arms 21, and each nozzle extends outwardly from its arm 21 through an opening or bore 15e in the cooling plate 15a and through a bore or opening 67 axially aligned therewith through the core plate 60—65. Each nozzle 24 is provided with an axial discharge duct 25 therethrough which opens at its inner end into the runner duct 23 and discharges at its outer end through the outer end of the nozzle at the inner side of the core 61 of core plate 60. While in the illustrated example the distributing and heating unit H provides four (4) arms and runner ducts with four (4) mold cavity injection points provided by the injection nozzles 24, it is to be understood that my invention is not limited to any particular number of such elements, as any desired number of arms, ducts and nozzles may be provided to meet the particular conditions of any specific mold adaptation and molded component to be produced thereby.

Thus, the distributing and heating unit H provides multiple injection nozzles 24 spaced apart at distances radially outwardly from and also spaced equal distances apart around the center of the core plate 60 of the fixed, injection section F of the mold. Hence, molten thermoplastic molding material may be injected by the molding machine during the injection stroke thereof into the sprue bushing 11 under pressure and will be pressure forced therefrom into the manifold duct 22 of unit H from which manifold duct it is distributed by the injection pressure through the runner ducts 23 into and through the injection nozzles 24. From the injection nozzles 24 the material is discharged into the mold cavity of the movable section M when the sections F and M are in closed positions, as will be described and explained hereinafter.

By my invention I not only provide through the medium of the distributing unit H for the simultaneous injection directly into a mold cavity at a plurality of injection points, but also provide for the utilization of the unit H for the continuous automatic heating of the unit to maintain the thermoplastic in the manifold duct 22, the runner ducts 23 and in the intake ends of nozzle ducts 25, in a molten, pressure flowable state. By thus heating and maintaining the thermoplastic in a molten state against solidification during opening of the mold for discharge of the molded component it is possible to substantially continuously operate the mold without any appreciable time period between the completion of one molding cycle with discharge of the molded component, and the start of the next cycle.

In carrying out such continuous heating of the molding material in the unit H of this example, I have provided each arm 21 with electrical heating elements of the resistance type familiar in the art, in form of the heating cartridges 30. A bore 31 is formed in each arm 21 disposed longitudinally thereof at each side of and along and adjacent the runner duct 23 in the arm. Each bore 31 opens through the outer end of the arm and extends inwardly through the arm to and a distance into the central body 20 of the unit H. A heating cartridge 30 is mounted and confined within each bore 31 in heat exchange relation through the material of the arm, with the thermoplastic material in the manifold duct 22, the runner duct 23 and the inner intake end of the duct 25 in the injection nozzle 24. The body 20 and the arms 21 of the unit H are formed of a suitable heat conducting material, such as one of the metals of metal alloys. The arrangement and relative locations of the heating cartridges 30 in the unit H and the heat generating capacity of the cartridges is such that the thermoplastic material injected into and through the ducts into the unit will be maintained at the desired temperature to thereby maintain the required molten, pressure flowable state for the particular mold conditions and the particular thermoplastic being molded.

Each heating cartridge 30 is supplied with electrical current through a pair of circuit wires 32 and 33, which may be enclosed in an insulating cable and which are connected into the cartridge at the outer end thereof through the arm bore 31 in which such cartridge is mounted. The circuit wires 31 and 32 for each cartridge 30 are housed and extended through suitable bores in the body block 15 of section F to the exterior of the block and are then lead to and connected into a power line P1 and P2 (see Fig. 5) leading from any suitable source of electrical power (not shown). With the heating cartridges 30 thus supplied with power from the power lines P1 and P2, such cartridges maintain the unit H at the required temperature at or above the melting point of the particular thermoplastic distributed under pressure through the unit to thereby continuously maintain such thermoplastic in a flowable state for the particular injection pressures to be used therewith.

An automatic temperature control of the heating cartridges 30 is provided in order to maintain the temperature of the unit H and the thermoplastic material within the several ducts thereof at a predetermined temperature or within a predetermined temperature range. Referring to Figs. 1 through 13 in connection with Fig. 5, such automatic control may be obtained, as in the specific example hereof, by means of a thermostat switch comprised of the movable contacts 40 and 41 connected in power lines P1 and P2, respectively, for circuit closing engagement with and circuit opening disengagement from the fixed contacts 42 and 43 in such power lines. (See Fig. 5). An annular thermostat bulb 45 in the form of a split ring, is connected at one end into and in sealed communication with a capillary tube 46 which extends therefrom outwardly through a bore in plate 15 to a pressure fluid actuated diaphragm unit 47. Diaphragm unit 47 is provided with an actuating member 48 in operative engagement with the movable switch contacts 41 and 42. These contacts may be, as is usual, spring loaded and continuously biased to circuit closing positions when the diaphragm unit 47 is in its normal inactive condition. The thermostat bulb 45 is comprised by a tube filled with a high boiling point liquid with one end of the tube closed and the opposite end connected in communication with the capillary tube 46, as referred to above.

Figure 5:
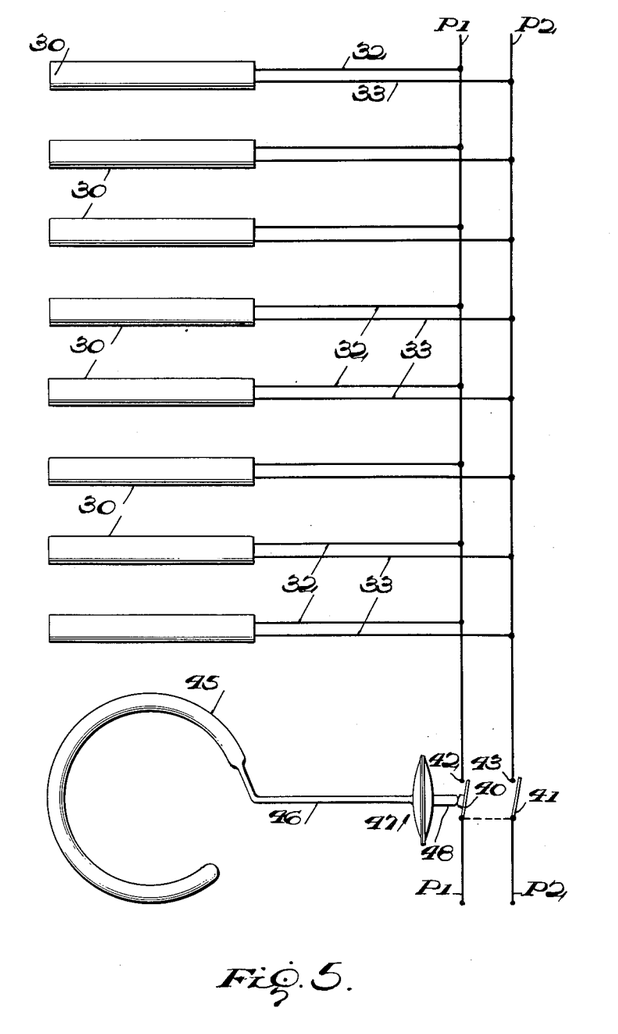
Fig. 5 is a schematic view of the heating units and the power circuits thereto with the thermostatically controlled switch for such circuits.

When the liquid in bulb 45 is at low temperature condition the diaphragm 47 is in its inactive, non-expanded position, with the spring loaded, movable switch contacts 41 and 42 in power circuit closing contact with the fixed contacts 43 and 44, so that current is supplied to the heating cartridges 30. When, however, the temperature of unit H, that is to say the temperature within the thermoplastic material distributing ducts 22 and 23, reaches the predetermined high temperature then the liquid within the bulb 45 expands and the excess of normal bulb volume of that liquid flows into tube 45 and expands the diaphragm unit 47. Such expansion of diaphragm unit 47 actuates member 48 of that unit to force the movable contacts 41 and 42 to position opening the circuit in power lines P1 and P2 to thus cut off operating current to the heating cartridges 30. After cutting off current to the cartridges 30, when the unit H cools down to a predetermined low temperature a reverse functioning of the thermostat bulb 45 and diaphragm unit 47 takes place and the switch in the power lines P1 and P2 is closed with a resumption of flow of heating current to the cartridges 30.

The movable mold section M in this particular example, includes and provides the mold cavity C into which the molding material is directly injected from the multiplicity of injection nozzles 24 of the fixed section F of the mold. This movable mold section M includes an outer side or back plate 50 which is adapted to be attached in the usual or any suitable manner to the movable platen 3 of an injection molding machine. A generally similarly dimensioned block or plate 51 is attached to the back plate 50 in position thereagainst at the inner side thereof. These plates 50 and 51 are thus movable as a unit structure by and with the movable platen 3 of the machine. A core pin mounting plate 52 of substantially smaller plan dimensions than the plate 51 is centrally positioned on and attached to the plate, the plate being suitably recessed to receive this core pin plate as will be clear by reference to Fig. 2. Rails 53 are attached to the inner side of plate 51 within the recess provided for the core pin plate 52, in position framing and enclosing the core pin plate with the inside surfaces of the rails in tight engagement against the outer side edges of the plate 52. The rails 53 are generally rectangular in cross section, in this instance being of square section, and these rails have a thickness or depth substantially greater than the thickness of core pin plate 52, so that they form and surround a space therewithin at the inner side of plate 52 which is of substantial depth and which is open at its inner side facing the core plate 60 of the fixed section F of the mold. The plates 50, 51 and 52 and the rails 53 are thus attached together and move as a unit structure relative to the fixed section F between mold closed and mold opened positions.

Figure 1:
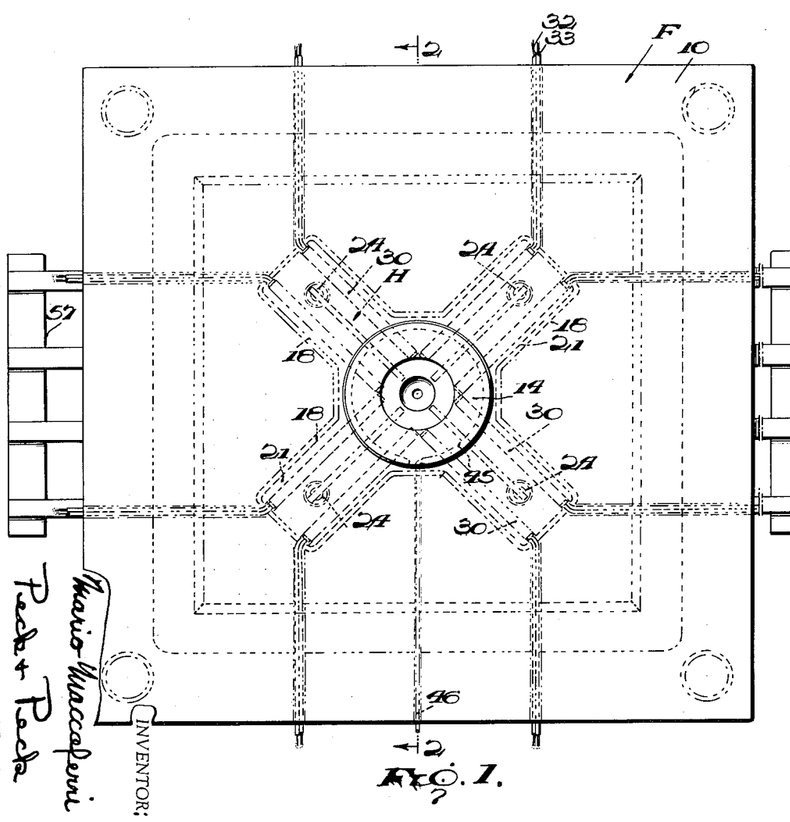
Fig. 1 is a view in elevation of the outer, injection side of the fixed section of a mold of the continuously operating type of my invention.
Figure 2:
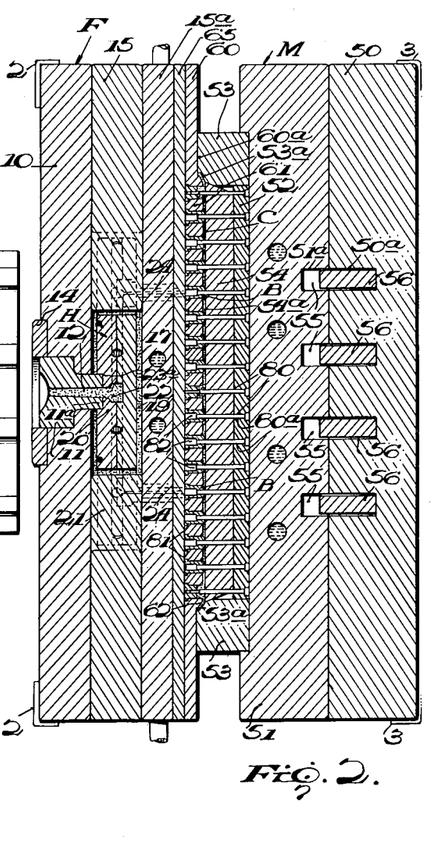
Fig. 2 is a view in transverse section through the mold of Fig. 1 in closed, molding position, taken as on the line 2—2 of Fig. 1.
Figures 9, 10, 11, 12, 13:
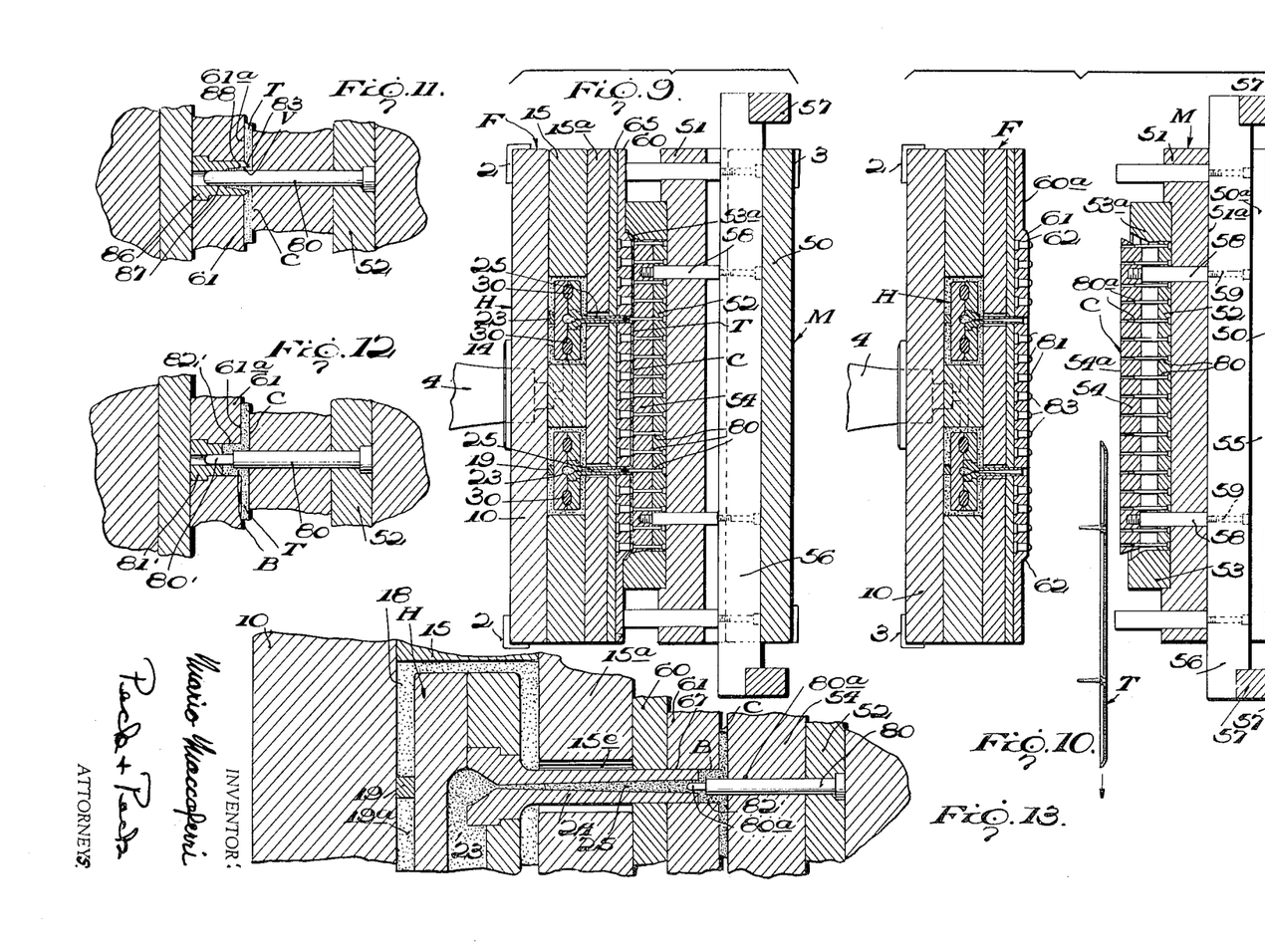
Fig. 9 is a vertical transverse section through the mold of Fig. 1, with the mold in closed position and a molded component in the form of a tile in the mold cavity.
Fig. 10 is a view of the mold of Fig. 9 in mold opened position showing the molded component in position falling therefrom by gravity.
Fig. 11 is a detailed sectional view of a modified form of core pin receiving bushing for molding an integral tube at one side of the molded component formed in the mold cavity.
Fig. 12 is a detailed sectional view through a core pin and bushing for molding a nailing boss on one side of the molded component.
Fig. 13 is an enlarged detailed view in section through an injection nozzle and associated structure of the form of the mold of Fig. 1.

Within the space framed by the rails 53 there is mounted the cavity block 54, which in this instance is of generally square plan form and is dimensioned to movably fit within and substantially occupy the space between rails 53. In normal position cavity block 54 seats against the inner surface of the core pin mounting plate 52. The cavity block 54 and the plate 52 with rails 53 are movable relative to each other in the functioning of the mold, as will be more fully described and explained hereinafter. Referring to Figs. 2 and 10, the plates 50 and 51 are provided with pairs or sets of aligned and facing slots 50a and 51a opening into each other and providing therebetween the ways 55 which extend completely across the plates and which open through opposite side edges thereof. The ways 55 are located across the intermediate portion of plates 51 and 52, and in this specific example are four in number, although any lesser or greater number thereof may be provided as may be found desirable in any particular mold. Within each way 55 there is mounted a stop rail member 56 which extends longitudinally therethrough but which has a width less than the depth of the way in which mounted, so that the stop rail member is movable in and transversely of the way. The stop rail members 56 extend at their outer ends outwardly a distance beyond plates 50 and 51 and are joined together as a rigid unit structure by the transverse bridge members 57, as will be clear by reference to Figs. 2 and 10.

The mold cavity block 54 is attached to and movable as a unit with the rails 56 independently of the plates 50, 51, 52 and the rails 53, through a limited range of movement. This attachment is effected in this instance by stud bolts 58 which are connected between the cavity block 54 and the stop rail members 56. Each bolt 58 at one end 56a thereof is threaded into cavity block 54 and at the opposite end thereof abuts the edge of the stop rail member 56 with which it is associated and is attached to that rail member by a screw 59 which is extended through the rail and threaded into the end of the bolt 58. Each stud bolt 58 slidably extends through suitable bores formed to receive the bolt transversely through the plates 51 and 52. Any required number of bolts 58 may be provided between and attaching each stop rail member 56 to the cavity block 54.

The mold cavity block 54 has a thickness less than the depth of the space within and framed by the rails 53 between the core pin plate 52 and the outer edges or sides of the rails, and provides by its outer exposed side 54a one side wall of the mold cavity C. In this particular example the mold is designed to produce a tile plate having a continuous, angularly disposed edge flange completely therearound, and for effecting the molding of such flange, the rails 53 are beveled at 53a, at and around their inner edges with these beveled surfaces adapted to join and in effect merge with the mold cavity surface 54a of the mold plate 54. The bevels 53a on the rails 53 provide one side of the surrounding edge wall of the mold cavity for molding the particular construction of tile for which this specific mold is primarily designed.

The core 61 of the core plate 60 which is attached to and rigid with the fixed section F of the mold, forms the side wall of the mold cavity C opposite the side wall formed by surface 54a of cavity block 54, when the mold sections are in cavity closing position. The core 61 of core plate 60 has plan dimensions to present the cavity side wall surface 60a of an area which is substantially coextensive with the area of the side wall surface 54a of cavity C of the cavity block 54. This core 61 has a thickness or depth of projection from the surface of plate 60, such as to fit a distance down into the mold cavity C but spaced therefrom to form the mold cavity of a thickness or depth equal to the thickness of the plate to be molded in the mold cavity. The core 61 is beveled at 62 completely around its edge, and the core 61 is so dimensioned that when the core plate 60 is seated in mold closed position on and against the outer sides of the rails 53, the bevels 62 are spaced from rail bevels 53a to form therebetween the space in which the continuous flange of the required thickness is molded around and integral with the tile molded in the plate forming cavity C.

In accordance with an important feature of my invention I obtain a substantial reduction in resistance to flow and distribution through the mold cavity C from the injection points therein provided by the spaced injection nozzles 24. By this reduction in resistance in a shallow, relatively large area mold cavity for thin-section plate or sheet molding therein, it becomes possible with a given injection pressure to increase the area of the plate or sheet which can be efficiently molded, or, with a given area to reduce the injection pressure and hence the power required to injection mold the plate or sheet by a "one-shot" injection. In the molds of the selected examples hereof, relatively large area, thin-section plates are to be molded, and, as taught by another feature of my invention, multiple injection points for direct simultaneous injection into the mold cavity are provided to further increase the efficiency of the molding cycle. However, the principles of the invention by which flow resistance is reduced and uniform density throughout a plate is obtained, are equally well applied to and are being utilized with the molding of a plate in a relatively shallow mold cavity where but a single point of injection into the cavity is used.

Figures 6, 7, 8:
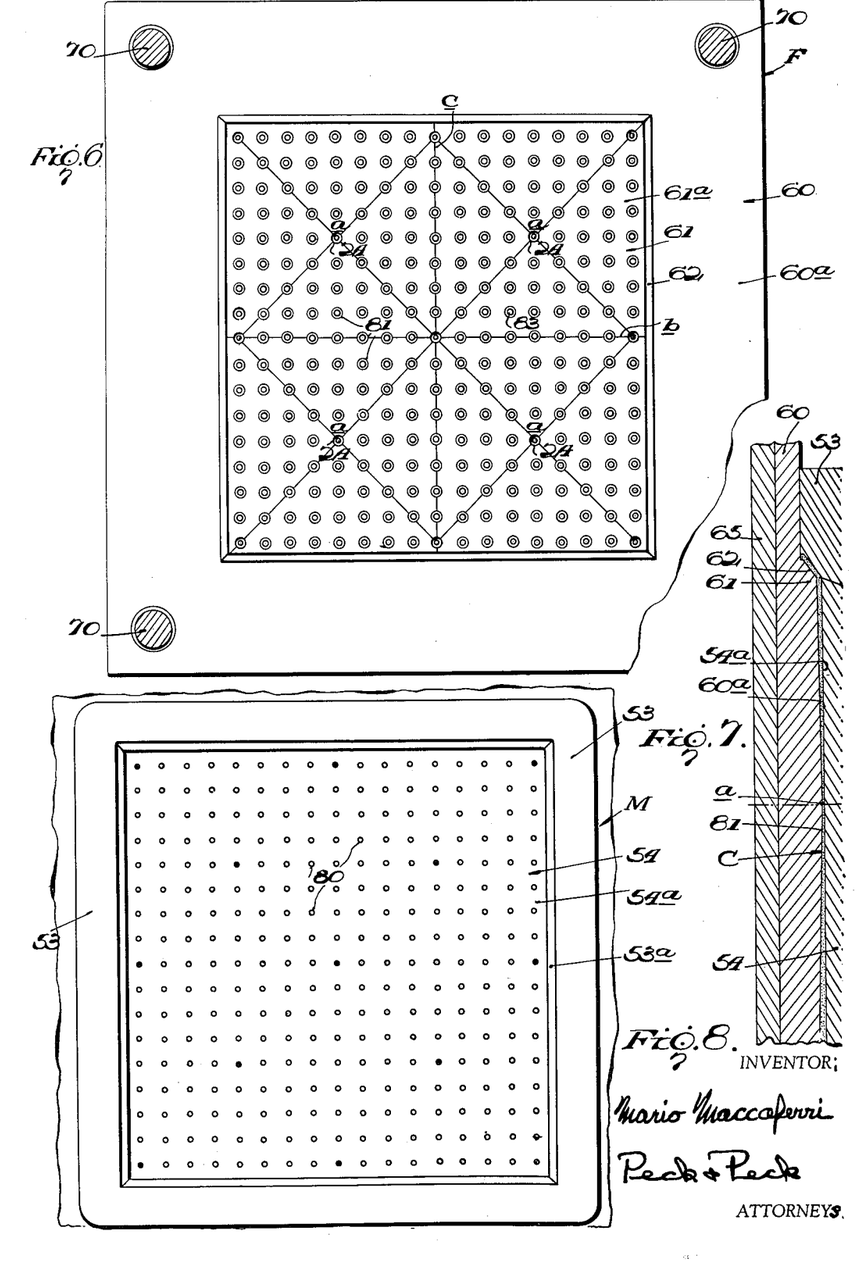
Fig. 6 is a view in elevation of the core and core plate of the fixed mold section with the mold in open position.
Fig. 7 is a detail, fragmentary sectional view of the mold sections in closed position with the mold cavity closed by the core plate.
Fig. 8 is a view in elevation of the inner side wall of the mold cavity formed by the cavity block of the movable section of the mold.

While the multiple injection point mold of the example, referring now to Fig. 6 which is a view in elevation of the core 61 of the core plate 60, showing each injection point provided by an injection nozzle 24, each of such injection points is located at the approximate center of a quarter-section of the area of the surface 60a of core 61. I form the area of the core 61 at each injection point, which area or location I have identified by the reference characters a, as an elevation or "high" spot of the surface 60a of core 61. Thus, with the mold sections in closed position and the mold cavity C closed at its opposite sides by the walls 54a and 60a, such elevations a provide the mold cavity C as of smallest depth or thickness at each of the four (4) injection points a. The surface of each quarter-section of wall area around the injection point located centrally thereof is then gradually sloped or inclined radially inwardly from and around the "high" spot a thereof, to the boundaries of the quarter-section provided by the outer edges of core 61 and by the lines of jointure along and between the adjacent quarter-sections of the area of core 61. These lines of jointure between the quarter-sections are identified by the reference characters b and c in Fig. 6, and they traverse the "low" portions or areas of the contour of the surface 60a of the core 61, to which portions or areas the wall surface progressively slopes downwardly or inwardly from the "high" at the injection point. Similarly, the outer edges of core 61 along and any suitable distance inwardly from the forward edges of the bevels 62, border or frame the "low" portions or areas at the outer edges of a quarter-section to which the surface 60a of core 61 progressively drops downwardly or inwardly from the "high" spots at the injection points provided by the injection nozzles 24. Depending upon the particular conditions desired, the "low" portions along lines b and c, and along the outer edges of surface 60a of core 61, may be in effect ridges or may have any desired width inwardly to form flat, planar, plateaus of uniform or varying width up to which the surfaces slope from the elevations or "high" spots at the injection point.

In the mold of the example for the specific tile to be produced thereby, the plan dimensions of the substantially square side walls provided by the surfaces 54a and 60a, is approximately 11½" by 11½". The maximum thickness or transverse depth of the mold cavity C between the side walls thereof is 0.06", and this thickness is provided by and between the portions of the mold along the lines b and c and the outer edges of the bevel 62 of the core 61 of core plate 60, and the facing portions of wall 54a. The minimum thickness or transverse depth of the mold cavity C is 0.055" and is divided by and between the "high" spots or elevations a at the injection points in the core 61, and the opposite or facing portions of the side wall 54a of cavity block 54. There is thus a difference of 0.005" between the minimum depth of the mold cavity C and the areas of maximum depth which are spaced from and around each injection point. This difference in depth of the mold cavity progressively increases radially outwardly from and around each injection point by the progressive inward slope of the surface 60a of core 61, as hereinbefore described and explained. It will be further noted that with this particular mold cavity having the plan dimensions of 11½" by 11½", and the injection points therein formed at the approximate centers of the quarter-sections of the area of the mold, that the shortest distance from each injection point to a boundary location of maximum depth of mold is approximately 2¾" while the maximum distance between the injection point and a location of maximum depth of mold at the corners of the quarter-section is approximately 4". Thus, I have provided in this particular instance a progressive increase in mold depth which attains a maximum of approximately 0.005", spread over linear distances ranging radially outwardly from the injection point within a range of approximately 2¾" to 4".

By such design of the mold cavity C flow passages, paths or space for the injected charge of molten thermoplastic are provided from an injection point radially outwardly through the mold cavity from and around the injection point to the outer edge limits of the area of the mold cavity to be supplied from that injection point, which offer a minimum of frictional resistance to pressure flow of the molten material. Hence, efficient distribution can be obtained throughout with a given charge and given injection pressure over a maximum area of mold cavity in a minimum of time. With such minimum resistance to flow under given conditions of material and injection pressures there is obtained for the molded component a substantially uniform density throughout with a minimum of internal stresses within the structure of the molded component which tend to cause structural fractures or failure. Further, it becomes possible to efficiently injection mold relatively larger area, thin-section plate or sheet forms than has heretofore been possible with the injection molds and molding practices known to me for injection molding plate or sheet-like components.

In connection with the foregoing principles of mold cavity design and multiple, direct injection into such a shallow, relatively large area cavity, it is not intended by the illustrative examples hereof to limit the invention to obtaining the variations in cavity depth solely by the described formation of the contour of the surface 60a provided by the core 61 of the core plate 60, as, if desired, surface 60a may be formed perfectly flat or planar, with the surface 54a of the cavity block 54 contoured to provide the required "high" and "low" points with the progressive inward or downward sloping of the surface therebetween, or both of the cavity side wall surfaces may be so formed and contoured as to mutually contribute to the desired end. In the selected example, the wall surface 60a of core 61 is utilized because it is required that the molded component have one side of the plate body thereof precisely planar to form the face of the component, and hence the surface 54a of the cavity block 54 is formed perfectly planar for that purpose.

The mold sections F and M, including the relatively movable components of the section M, are assembled on the four (4) leader pins 70 which are attached in fixed, rigid positions to plates 10 and 15 which make up with the cooling plate 15a and the core plate 60, the fixed section F. The leader pins 70 are slidably received in the bushings 71 secured in suitable bores in the plate 51 of section M. The mounting and arrangement of the leader pins 70 is shown particularly by Fig. 16 of the drawings.

In the example embodiment of mold of the invention, the thin-section, relatively large area plate body of the tile component T to be molded is required to be formed with a multiplicity of relatively closely spaced apertures therethrough distributed over the entire area of the plate body of the tile. For molding the plate body with such apertures therethrough, the plate 52 of movable section M of the mold is provided with and mounts a plurality of core pins 80. The core pins 80 are attached and fixed in rigid positions in the plate 52 in the required spaced parallelism with their axes normal to the plane of the plate. These core pins 80 are extended outwardly from plate 52 into and through the cavity plate 54, being received slidably in bores 80a formed through block 54. The core 61 of the core plate 60 which forms a fixed part of the fixed section F of the mold, is provided with a plurality of bushings 81 mounted in fixed, rigid positions therein in axial alignment with the core pins 80, respectively, and these core pins 80 in closed position of the mold extend through and across the mold cavity C and are slidably received in and extend into the open outer end lengths of the bores 82 formed through these bushings. The outer ends of these bushings 80 may, as shown in this example, project a slight distance into the mold cavity C when the mold is closed, and these projected ends may be formed to provide frustro-conical noses 83 for the purpose of molding annular recesses into adjacent side of a plate body around and concentric with the apertures formed in such body by the core pins. Such construction and arrangement will be clearly understood by reference to Fig. 9, in which the completed mold tile plate T is shown in the mold cavity C before the mold is opened for discharge of the tile.

Figure 15:
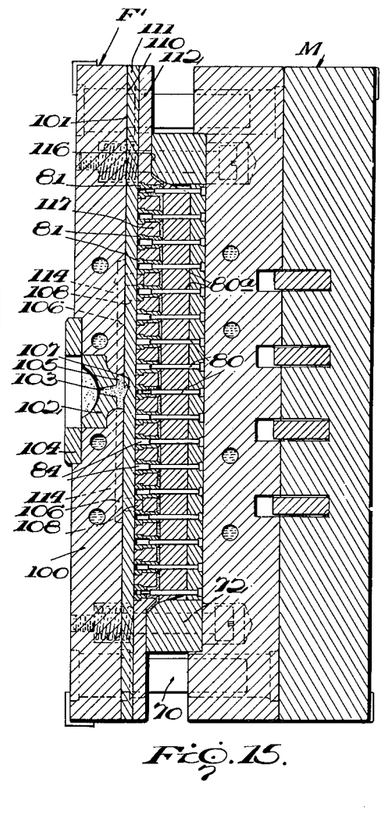
Fig. 15 is a transverse section through the mold of Fig. 14 with the mold in closed position and taken as on the line 15—15 of Fig. 14.

Referring to Fig. 15, certain of the bores 82 of bushings 81 are counterbored at the inner side of the plate 60 and are open therethrough and closed by the plate 65 which is attached to plate 60. Plugs 84 are mounted in the counterbores of such bushings 81, and the core pins 80 are each of such a length as to engage the plug 84 in a bushing 81 in which the pin is received when the mold is in closed position. In this manner the plate 60 is supported against the pressure of the injected thermoplastic as it initially strikes against plate 65 before continuing on and filling the remainder of the mold cavity. If desired this purpose may also be attained by making pins 80 sufficiently long to engage plate 65 in closed position of the mold, thus eliminating the necessity for the plugs 84. Any desired number of bushings 81 may be counterbored and provided with plugs 84, or the alternate provision of longer core pins may be utilized to a number desired or found expedient.

Figure 3:
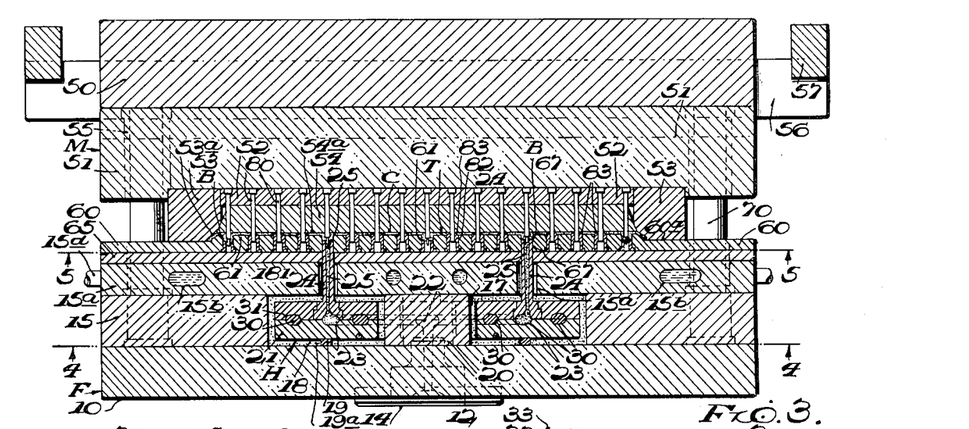
Fig. 3 is a view in transverse section through the mold of Fig. 1 with the mold in closed position, taken on the line 3—3 of Fig. 1.
Figure 4:
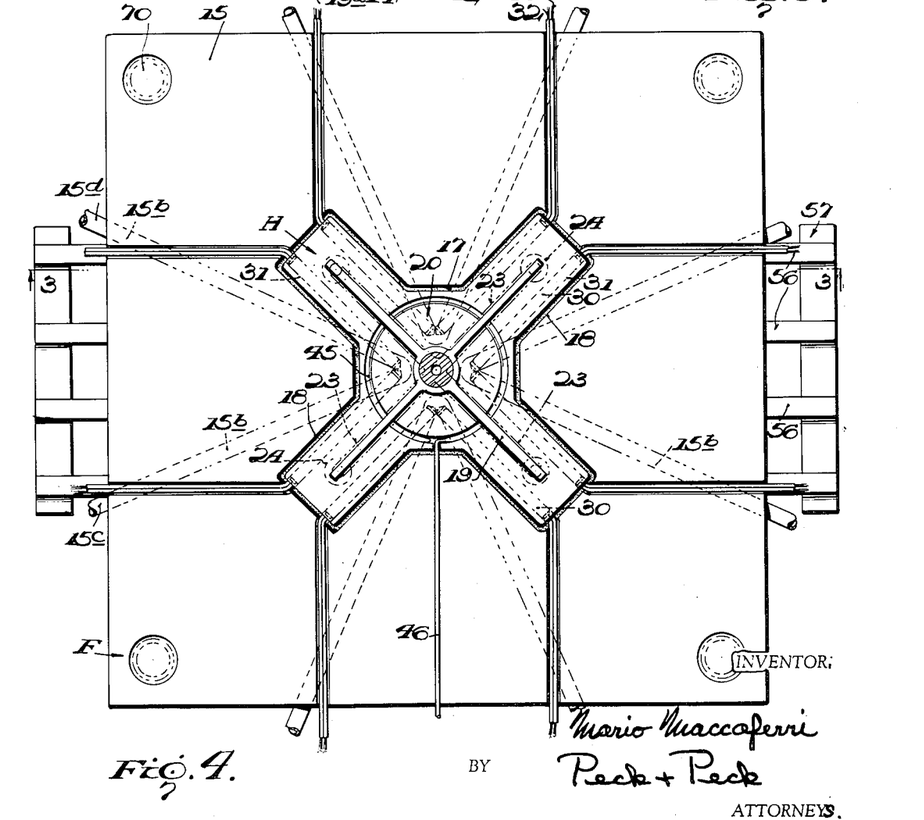
Fig. 4 is a view in elevation of the outer side of the heating and distributing unit and the plate of the fixed section in which mounted, with the outer or injection plate of the mold section removed.

The mold of this example also provides for molding on one side of a tile plate T, a number of hollow nailing bosses B, which in accordance with another feature of the invention may be located at the injection points and formed or molded in conjunction with the injection nozzles 24. Referring to Figs. 2, 3 and 12, a boss B is molded at a desired location of a core pin 80 by providing the bushing 81' (see Fig. 12) for such core pin of a reduced length with its end terminating spaced a distance inwardly from the surface 60a of core 61 to thus provide in effect an enlarged diameter chamber 82' in the core 61 which opens into the mold cavity C. The core pin 80 for such boss forming bushing 81' is provided with a reduced diameter, extended end 80' which, with the mold in closed position, is extended through the inner portion of the chamber 82' and into the bore of boss 81', with the shoulder on the rod 80 and the inner end of the reduced diameter 80' being spaced outwardly a distance from the end of the bushing 81'. The boss B is thus molded as hollow and as opening through the tile plate but with an outer end wall having a reduced diameter bore therethrough.

In this particular example, nailing bosses B are formed at the four (4) injection points provided by the injection nozzles 24, by utilizing the nozzles 24 to take the place of the boss forming bushings 81' hereinabove described. Referring to Fig. 13, the nozzles 24 are formed of a length such that the end of each nozzle is located within the core plate 60 and core 61, spaced a distance inwardly from the surface 60a of the core. There is thus formed within the core 61 the chamber 82' in the end of the bore 67 which receives the nozzle 24, with this chamber opening into the mold cavity C. The core pin 80 for each injection nozzle-formed chamber 82' is provided with a reduced diameter and a reduced end length 80a which is adapted to extend a distance into the discharge end of the bore or duct 25 of an injection nozzle. The bore or passage 25 through an injection nozzle 24 is formed of progressively increasing diameter from its inner, intake end to its outer, discharge end, and the external diameter of pin end 80a is less than the internal diameters along the length of passage 25 through which this end 80a extends. There is thus provided an annular discharge passage or gate from nozzle 24 which is formed around and between the wall of nozzle passage 25 and the reduced diameter end 80a of the core pin 80. In this manner injection into the mold cavity C is made at normal points of aperture of the molded component, and in addition a required nailing boss or other molded element may be formed on the tile at each injection point. While in the particular mold for this specific tile of this example the injection points are at normal locations of the apertures of the pattern of apertures, it is to be understood that my invention is not so limited. If desired or found expedient injection points may be made at any suitable locations between normal apertures and without necessarily molding any structure on the tile body at such points.

As in certain forms of the tile to be produced in the mold of this example, it is required that a plurality of tubes be molded integrally therewith in positions projecting from one side of the tile plate in axial alignment with apertures in the plate, I have provided a design and construction of core pin receiving bushing for molding such a tube. Referring now to Fig. 11, such a bushing 86 is shown as formed with a core pin receiving bore 87 therethrough of a diameter to receive and form a slidable fit with a core pin 80 extended thereinto with the mold in closed position. The bushing 86 may as shown be formed with a recess molding nose 83. The bore 87 is counterbored for a distance thereinto from the nose end thereof to form an annular tube molding chamber 88 therein and therearound which surrounds and is closed at its inner side by the core pin 80 extended into the bushing. As shown in Fig. 11, the outer wall of chamber 88 which is formed by bushing 86 may be tapered to flare longitudinally outwardly so as to mold therein a tube having a wall of increasing thickness inwardly along the tube from the outer end thereof. A bushing chamber 88 with the mold in closed position and a core pin 80 extended through the bushing, is open to the mold cavity C and is charged with molten thermoplastic therefrom which fills the chamber and molds and sets into a tube V integral with tile plate T and having a bore therethrough opening through the aperture in the tile plate which is formed by the core rod 80. An integral tube V is shown molded in chamber 88 of a bushing 86, in Fig. 11.

*Operation through a molding cycle*

The mold comprised of the fixed section F and the movable section M, with the sections maintained in essential registry by leader pins 70, is mounted in the injection machine with the section F attached to the fixed platen 2 and the movable section N attached to the movable platen 3 of the machine in the usual manner familiar in this art. The mold is mounted in position with the shallow, relatively large area mold cavity C vertically disposed and the section M movable along a straight line, horizontal path defined and determined by the leader pins 70, between mold closed position engaged under pressure against section F and mold opened position withdrawn from section F. The component to be molded, such as tile T of this example, is formed by a measured charge of a thermoplastic material injected under pressure by "one-shot" or stroke of the injection mechanism of the machine into the mold cavity C. After injection of the charge into the mold cavity C, the cavity is opened for discharge of the molded component therefrom by withdrawal of the mold section M to positions spaced from the fixed mold section F. With the mold sections F and M in the closed position thereof engaged and clamped together under pressure, as shown in Fig. 9, upon completion of the charging and solidifying step of the cycle, the movable platen 3 of the machine starts the withdrawal of section M away from its closed position against section F. As section M moves from section F the rails 53 break engagement with and separate from the core plate 60, so that the mold cavity C is opened as section M is withdrawn from core plate 60 and core 61 thereof.

During movement of the mold section M from the mold closed position thereof shown in Fig. 9, the stop rail member 56 with the cavity block 54 to which they are connected, have remained in normal position with the core pins 80 extended through block 54 and through the mold cavity C, that is the position in which the cavity block 54 is seated against core pin plate 52 within the flange molding rails 53. Thus, in this initially opened position of the mold and cavity C, the tile T which has been molded in cavity C, will remain in that cavity held in position therein by the core pins 80 which extend therethrough and on which the tile T is supported. But during further movement of mold section M to the position of Fig. 10, the bridge members 57 at the opposite ends of the stop rail members 56 will engage against suitable fixed stops 57' which are located in the path of movement of these bridges, as will be clear by reference to Fig. 10. With the bridges 57 engaged against the stops 57' further movement in the mold opening direction of the stop rail members 56 and of the mold cavity block 54 which is connected to the rails, is stopped. Hence, the remaining elements or components of the mold section M that are free to continue outward movement toward fully opened position, are the plates 50 and 51, the core pin plate 52 with core pins 80, and the flange molding rails 53. Upon such continued movement of plates 50 and 51 with core plate 52 and rails 53, by the movable platen 3 of the machine to the end of the movement thereof constituting the mold opening face of the cycle, the cavity block 54 will be held stationary while the core pins 80 and the rails 53 will be moved outwardly relative to the cavity block, with the result that the core pins 80 and rails 53 are retracted to positions behind or to the rear of the plane passing through the mold cavity forming surface 54a of the cavity block 54. This retraction of pins 80 and rails 53 withdraws the pins from tile T in the open mold cavity so that this tile may then drop automatically by gravity from the mold. The final, fully open and discharging position of the mold is shown in Fig. 10 of the drawings with the tile T which has been molded into cavity C being shown in position falling from the mold by gravity.

Figure 17:
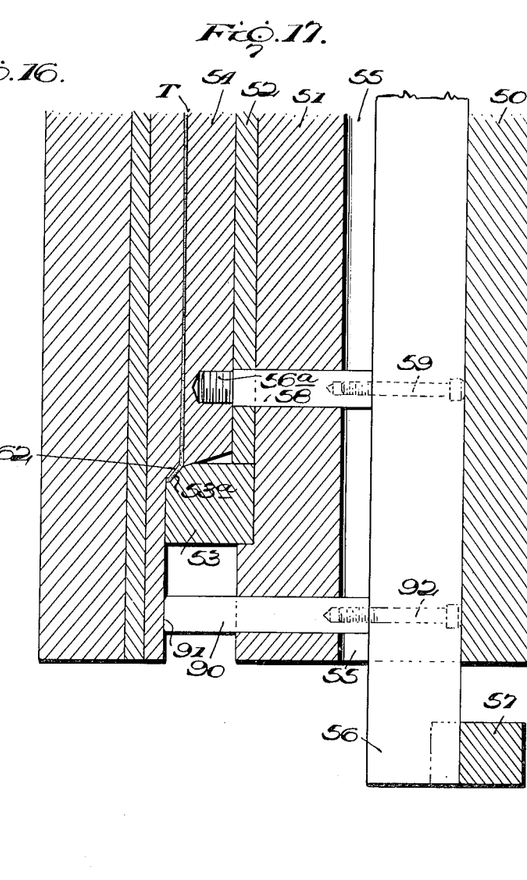
Fig. 17 is a detailed sectional view through a portion of the mold showing the attaching bolts between the cavity block and the stop rails for that block, and also showing one of the return pins for the cavity block.

Immediately following the discharge of the molded component, in this instance the tile T, from the mold cavity C, the movable platen 3 of the machine starts upon its reverse or mold closing stroke. Return pins 90 are provided for restoring the core pins 80 and rails 53 to normal projected position during the closing movement of mold section M. A set of these return pins 90 may be attached to each stop rail member 56 adjacent opposite edges, respectively, of plate 51. Pins 90 extend slidably through suitable bores in plate 51 to the core plate 60 against which the ends 91 of the pins are adapted to engage. The pins 90 are each attached to a stop rail member 56 by screws 92 which extend through the rail member and are threaded into the end of the pin, as will be clear by reference to Fig. 17, in which one of the return pins 90 is shown in detail.

On the mold closing stroke, as the plates 50, 51 and 52, with pins 80 and rails 53 and the return pins 90 move toward fixed mold section F, the return pins 90 will engage core plate 60 and arrest further movement of cavity block 54. Hence, the core pins 80 and the rails 53 will be projected to normal positions by the continued movement to closing position of plates 50, 51 and 52. When the section M reaches closed position with rails 53 engaged against core plate 60, the cavity block is restored to position engaged against plate 52 with the cavity C closed by the core plate and the core pins 80 projected across cavity C and received in position in the core plate bushings. Thus, the mold is closed and ready for the next charge of thermoplastic into the mold cavity C.

During the period of the opening of the mold by the withdrawal of mold section M from closed position against section F to its fully open position at maximum spacing from section F, the thermoplastic material within the ducts 22 and 23 of the distributing and heating unit H, is maintained automatically at the required temperature to remain molten and in a pressure flowable state, through the medium of the heating cartridges 30. It will be further noted that due to the multiple injection nozzles 24 being arranged to inject directly into the mold cavity C and to the further fact that the runner ducts are enclosed within unit H, there will be no solidified runners and sprues to be manually moved from the mold when the mold has reached its fully opened, discharge position of Fig. 10. Whatever solidified sprues are formed will be in the injection nozzles 24 and they will be integral at their outer ends with the nailing bosses B molded on tile T at the points of injection into the mold cavity C. As the outer ends of these sprues at their joindure with the tile T are of substantially greater external diameter than the diameter at their inner ends within the passages 25 of nozzles 24, and as these outer end portions are subjected to the cooling and solidifying effect of the cooling plate 15a while the inner ends are subjected to the temperatures of unit H, such inner ends will readily pull away at the inner ends of the passages 25 and the sprues will solidify and remain attached to the tile T as integral parts thereof. (See Fig. 10.)

Hence, no appreciable time period is required between the arrival of mold section M at the completely open position of Fig. 10, and the discharge therefrom automatically of the molded tile T, and the start of the mold closing movement of section M back into the mold cavity closing engagement with fixed section F, within which to manually or otherwise remove solidified runners and sprues to condition the mold sections for closing. The operation of the mold is substantially continuous and automatic to successively mold, open, discharge, close, charge and mold, and then open, through successive uninterrupted molding cycles for periods of productions as long as may be desired.

*Modified mold for intermittent operation*

Figure 14:
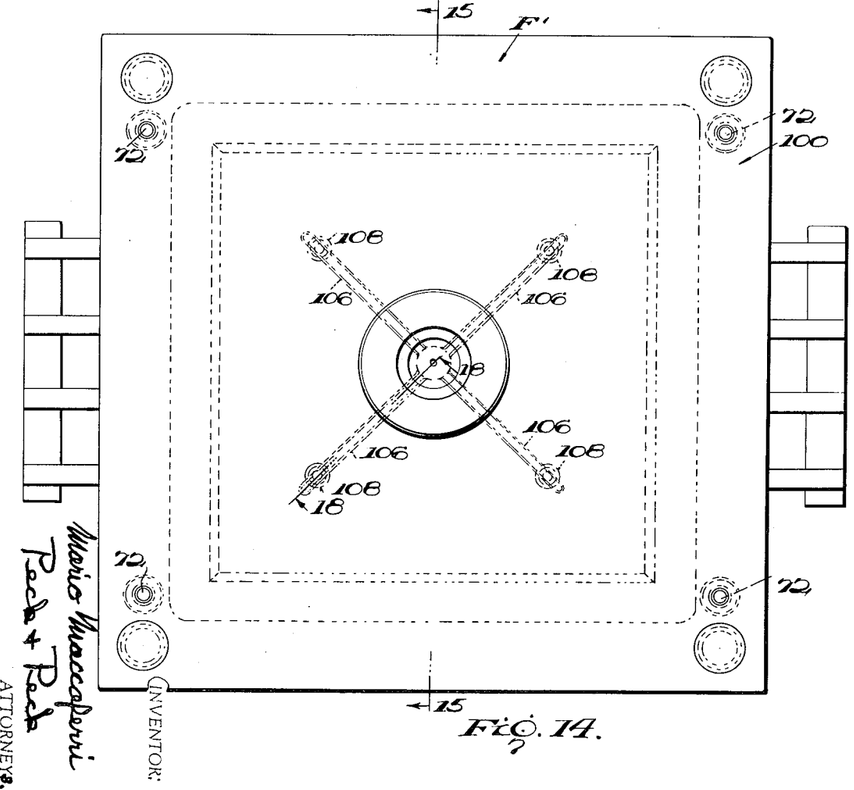
Fig. 14 is a view in elevation of the injection side of the fixed section of a modified form of mold for intermittent molding operations.

I have shown in Figs. 14 and 15, a modified form of injection mold embodying certain of the basic principles and features of my present invention. This modified form of mold eliminates and does not utilize the molding material heating and distributing features of the preferred form of the mold, so that this modified mold is capable of only intermittent operation in terms of the continuous operation of the mold of Figs. 1 through 13.

Figure 16:
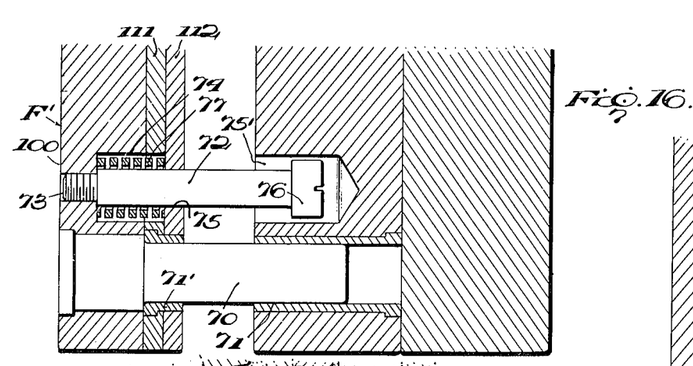
Fig. 16 is a detailed section through a portion of the mold of Fig. 14 showing one of the stripper bolts and one of the leader pins of the mold.

Referring to Figs. 15 and 16, the fixed section F' is comprised essentially of the block or plate 100 which provides the abutment or engagement face 101 against which the face 110 of the plate 111 of the core plate 112 is adapted to abut with the movable section M clamped against section F' in the closed position of the mold. The plate 100 is provided with the centrally located sprue bushing 102 having the axial passage 103 therethrough. The outer end of bushing 102 is surrounded by the locating ring 104 for receiving the injection nozzle of the machine. The inner injection side of plate 100 is formed with a manifold chamber 105 therein coaxial with passage 103 and opening through the surface 101 of the plate. In this particular example four (4) runner grooves 106 are formed in plate 100 radiating from and around chamber 105 and in communication with that chamber. Each runner groove 106 is open throughout its length through the face 101 of plate 100. Chamber 105 and runner grooves 106 are adapted to be closed by the plate 111 of the core plate 112 when the mold section M is in closed position clamped against the fixed mold section F'. An undercut 107 is formed through the surface 110 of plate 111 opposite and in line with the manifold chamber 105, for the purpose of removing the sprue formed in that chamber and the runners joined therewith, as will be referred to hereinafter.

Figure 18:
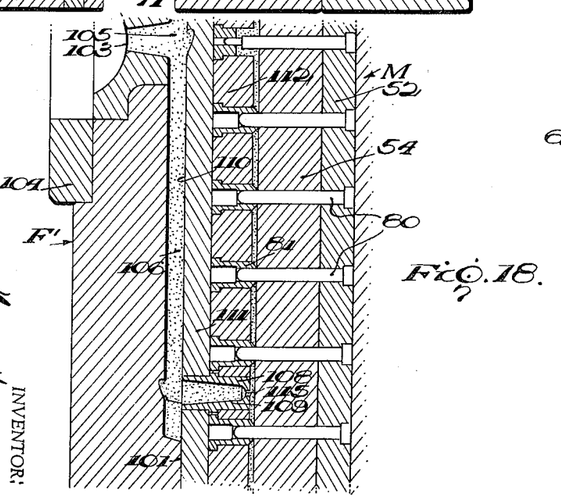
Fig. 18 is a sectional view through a portion of the mold of Fig. 14 showing a runner groove and a gate member discharging into the mold cavity with the mold in closed position.

Injection members, bushings or gates 108 are fixed in and extended through plate 111 and core plate 112. (See Fig. 18.) There are four (4) of these gate members positioned to register at their outer ends with and to open into the runner grooves 106 respectively, adjacent the outer ends of such grooves when the mold sections F' and M are in closed position. Each gate member 108 includes an axial passage 109 therethrough of progressively decreasing internal diameter inwardly to the inner discharge end of the nozzle which is formed to provide the reduced diameter orifice or "pin point" gate 115 therethrough for discharging into the mold cavity C. In this particular example, the injection gate members 108 are positioned in plates 111—112 at locations to discharge into the mold cavity C between core pin receiving bushing 81 and the respective core pins 80 therefor, although if desired these gate members may discharge through or rather be located to function as core pin bushings in the manner of the injection nozzles 24 of the continuous form of the mold of Figs. 1 through 13. The plate 100 is formed with an undercut 114 therein from each runner groove 106 opposite the gate member 108 for that groove.

The core plate 111—112 in this modified, intermittent form of the mold is not attached to the fixed mold section F', but in effect floats within a limited range of movement between the fixed mold section F' and the movable mold section M. In closed position of the section the core plate 111—112 is clamped in position between sections F' and M' with the surface or face 110 of plate 111 engaged against the face or surface 101 of block 100 of section F', and with the face or surface 116 which surrounds the core 117 on core plate 112, seated and engaged on and against the adjacent surfaces of the rails 53 of the movable section M. This closed position of the mold and of the core plate 111—112 with the core 117 in position in and forming one side wall of the cavity C in cavity block 54, is shown in Fig. 15 of the drawings.

The core plate component 111—112 and mold section M are movable relative to each other, while the core plate component is movable relative to section F' as referred to hereinabove. As in the continuous form of the mold, the sections F' and M of the modified form, including the relatively movable core plate component 111—112, are assembled on the leader pins 70 which are attached to the block 100 of section F', and which are slidably received in the bushings 71 secured in bores in the plate 51 of the movable section M.

In this example, referring now to Fig. 16, in connection with Fig. 14, four (4) stripper bolts 72 are attached to block 100 by threading the ends 73 thereof in the tapped bores in the block, as will be clear by reference to Fig. 16. These stripper bolts 72 are located adjacent and parallel with the leader pins 70 in the outer corner portions, respectively, of the block 100 constituting the mold section F', and each is thus positioned perpendicular to the block 100. Each stripper bolt 72 extends inwardly through an enlarged diameter bore 74 formed through block 100 and plate 111 of the core component 111—112. A reduced diameter bore 75 is formed in the core plate 112 through which the stripper bolt extends with a sliding fit. From plate 112 each stripper bolt extends into a well 75 in the plate 51 of the movable section M.

The free end of each stripper bolt 72 which is located in a well 75 is provided with a head 76 of smaller diameter than the diameter of the well to permit of free movement of the head and its bolt 72 in and through the well. Each enlarged diameter bore 74 in block 100 and plate 111 provides an annular chamber surrounding the stripper bolt 72 which extends therethrough, and a heavy, strong coiled expansion spring 77 is mounted in each such chamber around the stripper bolt under compression between block 100 and the core plate 112. These springs 77 thus mounted and arranged exert heavy compressive forces on the core plate component 111—112 to thereby maintain this core plate component in mold cavity closing position on and against the rails 53 of the mold section M. The arrangement of the stripper bolts 72 is such that at a predetermined position in the path of movement of movable section M, as section M displaces from closed position toward fully opened position, the core plate 112 will engage against the fixed position heads 76 of the stripper bolts 72 and will be held thereby against further movement with the section M, thus effecting initial opening of the mold cavity C.

Operation through a molding cycle of the intermittent form of the mold

The functioning of the movable section M of this intermittent form of the mold is substantially the same as that described for the movable section M of the continuous form of the mold of Figs. 1 through 13, and need not be here repeated. With the intermittent mold in closed position the core plate component 111—112 is clamped between section M and section F' as shown in Fig. 15. The molding machine then injects a charge of molten thermoplastic into the sprue passage 103 from which the charge is distributed under pressure into the mold cavity C through the runner grooves 106 and the gate members 108. After the charge is injected simultaneously through the plurality of "pin-point" gates provided by the gate members 108, the movable section M is drawn outwardly away from section F' toward mold opening and molded component discharging position.

As section M moves from section F' and the plate 111 of the core plate component breaks engagement with and separates from block 100, the spring units 77 begin to expand but continue under compression and maintain the core component 111—112 in mold cavity closing position on and against rail 53 of section M and force the core component to move as a unit with the section M. It will be here noted that plates 111 and 112 constituting the core component, are provided with the bushings 71' which are secured therein and which are slidably mounted on the leader pins 70, so that these plates may move as a unit along and guided by the leader pins.

As mold section M reaches a predetermined position the core plate component 111—112 will have traversed along the lengths of the stripper bolts 72 and into engagement against the heads 76 of these bolts. As the stripper bolts 72 are in rigid, fixed positions on the fixed section F' of the mold, the heads 76 of these bolts form fixed, positive abutments which constrain and prevent further movement of the core plate component 111—112 along the stripper bolts with the mold section M in the mold opening direction. Hence, continued outward movement of the mold section M by the movable platen 3 of the machine, moves the plates 50, 51 and 52 and the cavity block 54, together with the rails 53, as a unit away from the core plate component 111—112, which component is constrained by the stripper bolt heads 76, so that the opening of the mold cavity C results. However, with the mold in such open position it will be noted that the molded component, namely the tile T of this example, is retained in the mold cavity C by the horizontally disposed core pins 80 which project therethrough from the cavity block 54.

During the movement of the mold section M from the mold closed position of Fig. 15 to the mold cavity opened position described above, the stop rail members 56 with the cavity block 54 to which they are connected, have remained in normal position with the cavity block seated against core pin plate 52 within the flange molding rails 53. But during further movement of mold section M to the fully opened, discharging position, the bridge members 57 at the opposite ends of stop rail members 56 engage against the fixed stops 57' which are located in the path of movement of the bridges as described in connection with the continuous form of the mold. When the bridges 57 are engaged with the stops 57', then further movement of stop rail members 56 in the mold opening direction is stopped, and similarly further movement of the cavity block 54 which is connected to the stop rail members 56 is stopped. This leaves as the remaining elements free to continue outward movement to the fully opened position of the mold, the plates 50 and 51, the core pin plate 52 and the flange molding rails 53. It follows, therefore, that upon such continued movement by the movable platen 3 of the molding machine to the end of the movement which constitutes the mold opening face of the cycle, the cavity block 54 is held stationary while the plates 50 and 51 with the pin plate 52 and rails 53 are moved outwardly relative to the cavity block 54. Hence, the core pins 80 together with the rails 53, are retracted to positions behind, that is removed from the plane of the surface 54a of the mold cavity block 54. Such retraction of the pins 60 and rails 53, withdraws the pins from the tile T which has been molded in the mold cavity C, so that the tile T will then drop automatically by gravity from the mold cavity C and the mold apparatus.

Following the discharge of a tile T, or other molded component, from the mold cavity C, and after a suitable interval of time, the movable platen 3 of the machine may start upon its reverse or mold closing stroke. As the plates 50, 51 and 52, with pins 80 and rails 53, are moved in the direction of fixed section F', pins 80 and rails 53 are returned to their normal projected positions and the cavity block 54 is picked up and returned into normal position relative thereto. Continued movement, with the aid of the return pins 90, then picks up the core plate component 111—112 and the entire assembly with mold section M then moves into the fully closed position of Fig. 15, with the core plate component 111—112 clamped between the surface 101 of block 100 of fixed section F', and the rails 53 of the movable section M. The mold is then in condition for injection of the next charge of thermoplastic into the mold cavity C.

After the mold section M has reached fully opened position and before the return, closing movement of this mold section M can be initiated, it is necessary for the operator to manually remove the collected runners and sprues from the fixed section F' and the movable section M. This is usually done manually and requires a certain period of time in order to effect complete removal, as will be readily understood by those familiar with this art. In the initial opening of the mold, as the core plate component 111—112 separates from block 100 and opens the runners 106 in that block, the ends of the solidified material in the runner grooves are held therein by the undercuts 114, while the material in the manifold 105 and sprue passage 103 is drawn or sprung outwardly with the core plate component to thus raise the runners from the grooves 106 and expose this assemblage of solidified material for easy removal. After the removal of the runners and sprues as above explained, the interrupted operation of the mold may then be started again with the return movement of section M to closed position. Thus, with this intermittent form of the mold there is a substantially reduced rate of production over that possible with the continuously preferred form of the mold disclosed in Figs. 1 through 13, hereinbefore described and explained.

In connection with both the continuously operating form and the intermittently operating form of the mold, there is no intention to limit the invention to the disclosed designs and constructions for the injection molding therein of the specific forms of apertured and flanged tile components of the examples hereof. My invention contemplates and includes the production of plate or sheet-like components having a plate body without apertures and without edge flanging. The invention is intended and adapted for the quantity production injection molding of a wide variety of molded components which are basically characterized by relatively large area, thin-sectioned plate or sheet-like portions, that is to say plate or sheet-like portions having a very high ratio of thickness to area. The mold cavity C of the example molds for producing the particular tiles as hereinbefore generally described, is substantially square in plan and of a size or area of 11½" by 11½", while the edge flange around a tile T extends outwardly therefrom a distance of ½", so that the over-all plan dimensions of the tile are 12" by 12". The shallow mold cavity C, as hereinbefore referred to, has a maximum depth of 0.06" and a minimum depth of 0.055", while the flange molding cavities therearound have a thickness or depth of approximately 0.06". By the dimensions of the example mold cavities there is no specific limiting significance intended beyond the exemplification of the large ratio of area to depth of mold cavity and of the resulting component injection molded therein by "one-shot" injection of the full charge for the cavity. Attention is also particularly directed to the fact that with the same injection pressures, a plate or sheet of substantially the thickness of section of a tile T can be injection molded of substantially greater area if formed without apertures, as the friction or resistance to the flow and the distribution through the cavity offered by the core pins will then be eliminated.

With the intermittently operating form of the mold the flange molding rails 53 can if desired be mounted as movable with the cavity block 54 rather than being fastened to the plate 51. In such arrangement the rails 56 with the studs 58 and plate 50 can be eliminated, thus simplifying the construction of the mold section M. However, with this arrangement the molded component will not fall free from the mold cavity when the mold opens but will have to be manually removed.

It will also be evident that various changes, modifications, variations, substitutions, eliminations and additions may be resorted to without departing from the broad spirit and scope of my invention, and hence I do not desire or intend to limit the invention in all respects to the specific examples thereof as herein disclosed, except as may be required by intended, specific limitations thereto appearing in any of the appended claims.

What I claim is:

1. In an injection mold structure, in combination; a fixed mold section including a core plate thereon having core pin receiving bushings therein; a movable mold section mounted for movements between closed position clamped against said fixed section and open position spaced therefrom; said movable section including a body structure, a mold cavity block providing an open side mold cavity facing said fixed section core plate and adapted to be closed by said core plate with the mold sections in closed position, and core pins mounted on said body structure at the side of said cavity block opposite said mold cavity, said core pins being extended slidably through said cavity block and mold cavity and being slidably received in said bushings, respectively, of said core plate with the mold sections in closed position; said body structure and core pins being mounted for movement as a unit relative to and independently of said cavity block; and means for arresting movement of said cavity block to thereby effect retraction of said core pins through said cavity block by continued movement of said body structure and pins in the mold opening direction.

2. In an injection mold structure, in combination; a fixed mold section; a movable mold section mounted for movements between closed position clamped against said fixed section and open position spaced therefrom; said movable section including a body structure, a mold cavity block providing a mold cavity open at the side thereof facing said fixed section; core pins on said movable section body structure at the side of said cavity block opposite said cavity and being extended slidably through said block and said cavity, and rail members on said body structure in positions surrounding said mold cavity in said cavity block; said body structure, core pins and rail members being mounted for movement as a unit relative to and independently of said cavity block; and means for arresting movement of said cavity block to thereby effect retraction of said core pins and rail members relative to said mold cavity to positions withdrawn from said cavity by continued movement of said body structure, core pins and rail members in the mold opening direction.

3. In an injection mold structure, in combination; a fixed mold section; a movable mold section mounted for movements between closed position, clamped against said fixed section and open position spaced therefrom; said movable section including a body structure, a mold cavity block providing a mold cavity open at the side thereof facing said fixed section, and core pins on said body structure in positions extended slidably through said cavity block and cavity; said body structure and core pins being mounted for movement as a unit relative to and independently of said cavity block; said body structure being formed with a slideway therein; a rail member mounted in said body structure slideway for movements independently of and relative to said body structure; means connecting said rail member with said cavity block; and positive stop means adapted to be engaged by said rail member to arrest movement of said cavity block with said body structure to thereby retract said core pins from said mold cavity by continued movement of said body structure in the mold opening direction.

4. An injection mold structure formed to provide therewithin opposite side and surrounding edge walls forming therebetween a closed mold cavity of large area to depth ratio for molding therein a thin section plate of plastic material, a side wall of said mold structure having injection openings therethrough spaced apart over the area of said mold cavity discharging directly into the mold cavity, the side walls of said mold cavity at the inner, mold cavity-defining sides thereof being formed to provide the mold cavity of minimum depth in the portions thereof opposite said injection openings, respectively, and the inner sides of said side walls being formed to provide the portion of the mold cavity surrounding each minimum depth portion at an injection opening of progressively increasing depth radially outwardly from and around such minimum depth portion to the outer edges or perimeter of said portion of the mold cavity of progressively increasing depth.

5. An injection mold structure formed to provide therewithin opposite side and surrounding edge walls defining therebetween a closed mold cavity of great area to depth ratio for molding therein a thin section plate of plastic material; a plurality of injection openings in said mold structure for discharging directly thereinto a charge of molten plastic material; said injection openings being located in positions spaced apart over the major area of said mold cavity for discharging thereinto at a side thereof; the inner sides of the said opposite side walls which define the opposite sides of said mold cavity being formed to provide the portion of said mold cavity at each injection opening of minimum depth of mold cavity; and said inner sides of said opposite side walls being formed from and around each portion of minimum depth of mold cavity at an injection opening to provide a portion of the mold cavity of progressively and uniformly increasing depth radially outwardly from and around each such portion of minimum depth with said portion of increasing depth at the outer sides thereof extending outwardly to the outer edges, respectively, of said mold cavity adjacent thereto and at the inner sides thereof extending inwardly to and joining with the inner sides, respectively, of the adjacent portions of increasing depth which extend from the other of said injection openings adjacent thereto.

6. An injection mold structure formed to provide therewithin opposite side and surrounding edge walls defining therebetween a closed mold cavity of great area to depth ratio; a plurality of injection nozzles mounted in a side wall of said mold structure and opening into said mold cavity for discharging simultaneously directly thereinto a charge of plastic material; said injection nozzles being located in positions spaced substantially equidistant apart over the major area of said mold cavity; the inner, cavity defining sides of said opposite side walls being formed to provide a portion of limited area at and opposite each injection nozzle as of minimum depth of mold cavity; said inner sides of said opposite side walls being formed from and around each portion of minimum depth of mold cavity at an injection nozzle to provide a portion of the mold cavity of progressively increasing depth radially outwardly from and around each such portion of minimum depth; and each such portion of the mold cavity of increasing depth extending at the outer sides thereof to and being closed by the adjacent outer edges, respectively, of the mold cavity and the inner side edges thereof extending to and joining with and opening into the adjacent inner side edges, respectively, of said portions of increasing depth which extend from the portions of minimum depth of mold cavity at said injection nozzles adjacent thereto; said locations of joining of said adjacent inner side edges of said portions of increasing depth being approximately midway between the adjacent of said nozzles from which such portions of increasing depth respectively extend.

7. An injection mold structure comprising, in combination; a fixed mold section including a mold cavity closing core plate on one side thereof; a movable mold section mounted for movements bodily between position clamped against said fixed section over and closed by said core plate and open position spaced from the fixed section and said core plate; said movable section including a body structure at the side thereof opposite said fixed section, a cavity block located on said body structure at the side thereof facing said core plate on said fixed section and being formed to provide a mold cavity open at and adapted to be closed by said core plate; a core pin mounting plate positioned between said body structure and said cavity block; a plurality of core pins mounted in said pin plate normal thereto and extending slidably through said cavity block and said mold cavity; said body structure and cavity block being mounted for movements relative to said core plate to open and close said mold cavity; said body structure and said core pin plate and pins being mounted for movement as a unit relative to said cavity block; and means on said movable mold section connected with said cavity block for holding said block against continued movement thereof with said movable section body structure during continued movement of the latter structure to final open position of the mold to thereby retract said core pins from said mold cavity.

8. In the combination defined by claim 7, mold cavity edge wall forming rails mounted on said body structure of said movable mold section in positions surrounding said core pin plate and cavity block and extending outwardly beyond the mold cavity side of said block, said rails being connected to and movable as a unit with said body structure and core pin plate relative to said cavity block to retract said rails from extended positions thereof closing said mold cavity.

9. An injection mold structure comprising, in combination; a fixed mold section including a core plate on one side thereof; a movable mold section mounted for movements between closed position clamped against said fixed section over said core plate and open position spaced from said fixed section and core plate; said movable section including a body structure, and a mold cavity block providing a mold cavity therein open at the side thereof facing said core plate on said fixed section and adapted to be closed by said core plate with the mold sections in closed position; a core pin plate on said movable section positioned at the side of said cavity block opposite the mold section in said block; core pins mounted in said core pin plate extending slidably through said cavity block and said cavity therein; said core pin plate and core pins being mounted for movement as a unit relative to said cavity block; stop rail members mounted on said body structure at the side of said core pin plate opposite said cavity block and being connected to and movable as a unit with said cavity block; and relatively fixed stop means positioned in the path of movement of said stop rail members adapted to be engaged by said stop rail members to arrest movement of said cavity block with said movable section in the mold opening direction of movement of the said movable section.

References Cited in the file of this patent

UNITED STATES PATENTS

| | | |
|---|---|---|
| 1,865,464 | Geyer | July 5, 1932 |
| 2,111,857 | Jeffery | Mar. 22, 1938 |
| 2,227,263 | Knowles | Dec. 11, 1940 |
| 2,387,034 | Milano | Oct. 16, 1945 |
| 2,471,683 | Halbach | May 31, 1949 |
| 2,558,027 | Wilson | June 26, 1951 |
| 2,577,350 | Morin | Dec. 4, 1951 |
| 2,587,070 | Spillman | Feb. 26, 1952 |